Jan. 9, 1940.     M. J. HERZBERGER     2,186,605
OPTICAL SYSTEM
Filed Oct. 23, 1937

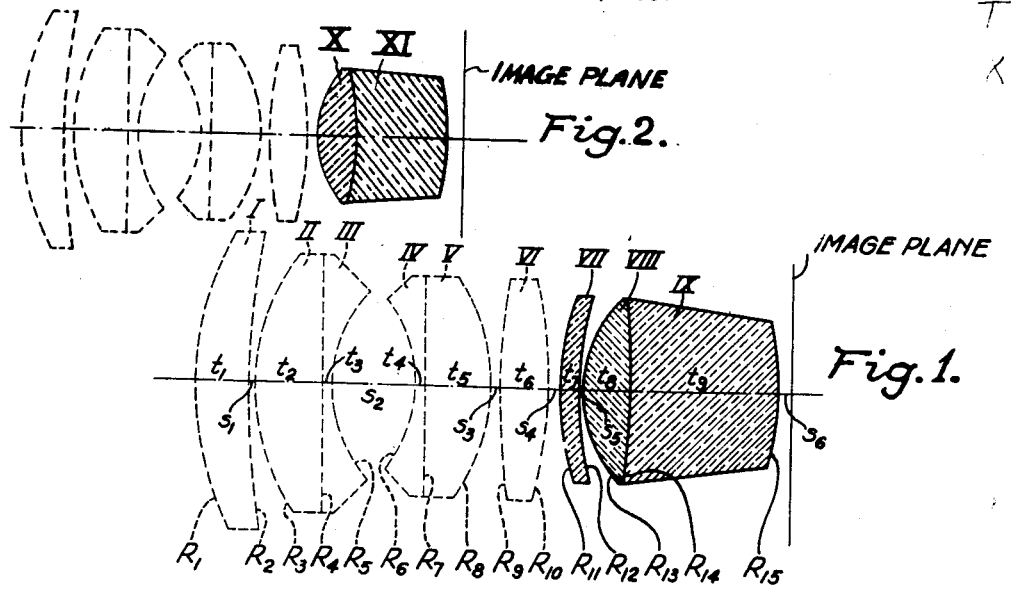

| OBJECTIVE | | |
|---|---|---|
| f/2.0 | | F=100 mm. |
| $R_1$ = 61.6 | $t_1$ = 10.4 | |
| $R_2$ = 369.1 | $s_1$ = 1.5 | |
| $R_3$ = 43.7 | $t_2$ = 13.2 | |
| $R_4$ = ∞ | $t_3$ = 1.9 | |
| $R_5$ = 26.5 | $s_2$ = 16.3 | |
| $R_6$ = −26.5 | $t_4$ = 1.9 | |
| $R_7$ = ∞ | $t_5$ = 13.2 | |
| $R_8$ = −34.4 | $s_3$ = 0.4 | |
| $R_9$ = 249.7 | $t_6$ = 10.4 | |
| $R_{10}$ = −86.4 | | |

| LENS | $N_D$ | $\nu$ |
|---|---|---|
| I | 1.61 | 57.2 |
| II | 1.61 | 57.2 |
| III | 1.60 | 38.2 |
| IV | 1.60 | 38.2 |
| V | 1.61 | 57.2 |
| VI | 1.61 | 57.2 |

| ATTACHMENT | | |
|---|---|---|
| $R_{11}$ = 55.5 | $s_4$ = 2.33 | |
| $R_{12}$ = 67.7 | $t_7$ = 3.54 | |
| $R_{13}$ = 25.2 | $s_5$ = 0.49 | |
| $R_{14}$ = −220.0 | $t_8$ = 9.50 | |
| $R_{15}$ = −55.1 | $t_9$ = 29.5 | |
| | $s_6$ = 2.13 | |

| LENS | $N_D$ | $\nu$ |
|---|---|---|
| VII | 1.498 | 65.3 |
| VIII | 1.498 | 65.3 |
| IX | 1.605 | 38.2 |

| COMBINATION | |
|---|---|
| f/0.813 | F=40.65 mm. |

Maximilian J. Herzberger
INVENTOR

BY *Newton M. Perkins*
*Rolla L. Carter*
ATTORNEYS

Patented Jan. 9, 1940

2,186,605

UNITED STATES PATENT OFFICE 2,186,605

OPTICAL SYSTEM

Maximilian J. Herzberger, Rochester, N. Y., assignor to Eastman Kodak Company, Rochester, N. Y., a corporation of New Jersey Application October 23, 1937, Serial No. 170,670

6 Claims. (Cl. 88—57)

This invention relates to lens systems and particularly to auxiliary lens systems to be combined with photographic objectives to give an increased relative aperture.

In U. S. Patents 1,910,115 and U. S. 1,952,268, B. E. Luboshez describes lens attachments combined with photographic objectives giving systems working at a relative aperture greater than f. 1. Actually, the effect of the attachment is to give a shorter focal length without reducing the entrance pupil of the system to any appreciable degree and hence the relative aperture is increased. The present invention relates to lens systems of this type and has for its object the providing of such an attachment more highly corrected and uniformly covering a greater field than hitherto.

Experience has shown that the employment of attachments of this general nature is accompanied by a considerable curvature of field—predictable from the inherently large Petzval sum. An object of the invention is to reduce the Petzval sum in such a system and to provide a system working at an aperture greater than f. 1. and having a relatively large covering power.

It is also an object of the invention to provide a system in which the astigmatism is reduced without undue increase in coma and/or in which the spherical aberration and coma are reduced without increasing the curvature of field.

According to the invention, the attachment is designed to be an aplanatic combination without having the individual surfaces thereof separately aplanatic. The rear surface of the attachment is made convex to the focal plane, i. e. concave to the incident light coming through the system which is contrary to usual practice when working at such high relative aperatures. In the preferred embodiment of the invention, at least one weak, thin, and preferably positive meniscus element is also included, spaced immediately behind and with its convex surface facing the photographic objective with which the attachment is to be used. Thus the preferred attachment consists of a front component including at least one meniscus positive element convex to the incident light and a rear component including a bi-convex element and a very thick meniscus element occupying the major portion of the optical distance between the photographic objective and the rear focal plane. From another point of view, the thick meniscus element may be considered as the rear portion of the attachment, the front portion being of different glass made up of a bi-convex element cemented to the rear portion and one or more meniscus elements spaced between the convex element and the photographic objective.

The thin front meniscus element having the appearance of an ordinary spectacle lens is arranged to correct astigmatism without affecting coma and/or with its front surface orthogonal to the principal rays it assists the rear component in correcting spherical aberration and coma without affecting the flatness of field materially.

Fig. 1 shows a cross section of an optical system incorporating the invention.

Fig. 2 shows another optical system incorporating the invention.

The invention is shown in its most preferred form, consisting of an attachment comprising elements VII, VIII, and IX, combined with any suitable photographic objective shown by broken lines as comprising six elements I, II, III, IV, V, and VI. However, the element VII may be omitted by increasing the power of the element VIII, the surfaces R—14 and R—15 both being concave to the incident light. This is illustrated in Fig. 2. Also additional elements could be included and more complex systems could be based on the simple form shown without departing from the spirit of this invention.

The typical photographic objective shown in broken lines has a focal length of 100 mm. for the specifications given in the following table which is similar to that accompanying the figure and a relative aperture of f. 2.0.

Objective f. 2.0     F=100 mm.

| Lens | $N_D$ | V | Radii | Thicknesses |
|------|-------|------|---------|-------------|
| I | 1.61 | 57.2 | $R_1=+61.6$ mm.<br>$R_2=+369.1$ | $t_1=10.4$ mm.<br>$S_1=1.5$ |
| II | 1.61 | 57.2 | $R_3=+43.7$<br>$R_4=\infty$ | $t_2=13.2$<br>$t_3=1.9$ |
| III | 1.60 | 38.2 | $R_5=+26.5$<br>$R_6=-26.5$<br>$R_7=\infty$ | $S_2=16.3$ |
| IV | 1.60 | 38.2 | | $t_4=1.9$<br>$t_5=13.2$ |
| V | 1.61 | 57.2 | $R_8=-34.4$<br>$R_9=\pm 249.7$ | $S_3=0.4$ |
| VI | 1.61 | 57.2 | $R_{10}=-86.4$ | $t_6=10.4$ |

The attachment consists of a meniscus positive element VII whose front surface is preferaby orthogonal to the principal rays which are the ones passing through the "principal points" of the objective, and a compound component comprising a bi-convex element VIII cemented to the front surface of a thick meniscus element IX whose thickness is such that almost all of the available space (limited by the image plane) is occupied. This gives a combination having an effective focal length of 40.65 mm. and a relative aperture of f. 0.81 and covering with good definition a field of approximately 9 degrees measured from the optic axis. The data for this attachment are as follows:

Attachment

| Lens | $N_D$ | V | Radii | Thicknesses |
|---|---|---|---|---|
| VII | 1.498 | 65.3 | $R_{11}=+55.5$ mm. | $S_4=2.33$ (from objective) $t_7=3.54$ mm. |
| VIII | 1.498 | 65.3 | $R_{12}=+67.7$ $R_{13}=+25.2$ $R_{14}=-220.0$ | $S_5=.49$ $t_8=9.50$ $t_9=29.5$ |
| IX | 1.605 | 38.2 | $R_{15}=-55.1$ | $S_6=2.13$ (to image plane) |

Fig. 2 shows the above mentioned case wherein the meniscus element VII is omitted and its power is included with the elements of the compound component, namely X and XI.

Having thus described in detail the preferred embodiment of my invention and the principle thereof, I wish to point out that it is not limited to the particular glasses and arrangement shown but is of the scope of the appended claims.

What I claim and desire to secure by Letters Patent of the United States is:

1. A rear component for forming with a photographic objective a high aperture system, said component comprising a thin weak meniscus lens convex to the incident light coming from the objective and with its front surface substantially orthogonal to light from the objective and a bi-convex compound component spaced therefrom and axially occupying the major portion of the distance between the objective and the focal plane of the system.

2. An optical system including a highly corrected photographic objective and an auxiliary rear component occupying the major portion of the distance between the objective and the focal plane of the system, said rear component having its front surface substantially orthogonal and convex to the light from the objective and including a thick compound lens adjacent to said focal plane and made up of a bi-convex element cemented to the front of a thick meniscus element whose index of refraction is greater than that of the bi-convex element, the thickness of the compound lens being greater than one-half said distance between the objective and the focal plane of the system.

3. An optical system according to claim 2 in which the rear component includes a thin meniscus lens spaced between the compound lens and the objective.

4. An aplanatic lens attachment adapted for use at the rear of a highly corrected photographic objective to form a high aperture system comprising a thin meniscus positive lens whose front surface is convex to the incident light from the objective and substantially orthogonal to the principal rays and a compound component spaced behind said meniscus lens, said compound component having definitely curved spherical refracting surfaces and comprising a front positive element and a thick rear element with a rear surface concave to the incident light, the attachment having an axial thickness less than, and more than half, the distance from the objective to the focal plane of the system.

5. A lens attachment adapted for use at the rear of a highly corrected photographic objective to form therewith a high aperture system said attachment having its front surface substantially orthogonal and convex to the light from the objective and including a thick compound lens made up of a bi-convex element cemented to the front of a thick meniscus element whose index of refraction is greater than that of the bi-convex element, the thickness of the compound lens being greater than one-half the distance between the objective and the focal plane of the combination of the objective and the attachment.

6. A lens attachment according to claim 5 including between the compound lens and the objective a thin positive meniscus lens whose index of refraction is substantially equal to that of said bi-convex element.

MAXIMILIAN J. HERZBERGER.